United States Patent
Chung et al.

(10) Patent No.: US 9,608,285 B2
(45) Date of Patent: Mar. 28, 2017

(54) STACK FOR A SOLID OXIDE FUEL CELL USING A FLAT TUBULAR STRUCTURE

(75) Inventors: Jong Shik Chung, Ulsan (KR); Hyun-Ki Youn, Daejeon (KR); Bu Ho Kwak, Gyungbuk (KR); Jung Duk Park, Gyungbuk (KR)

(73) Assignee: Postech Academy-Industry Foundation, Gyungbuk (KR)

( * ) Notice: Subject to any disclaimer, the term of this patent is extended or adjusted under 35 U.S.C. 154(b) by 611 days.

(21) Appl. No.: 13/265,196

(22) PCT Filed: Apr. 15, 2010

(86) PCT No.: PCT/KR2010/002326
§ 371 (c)(1),
(2), (4) Date: Nov. 16, 2011

(87) PCT Pub. No.: WO2010/123219
PCT Pub. Date: Oct. 28, 2010

(65) Prior Publication Data
US 2012/0070762 A1    Mar. 22, 2012

(30) Foreign Application Priority Data
Apr. 20, 2009    (KR) ................ 10-2009-0034167

(51) Int. Cl.
*H01M 8/04*    (2016.01)
*H01M 8/12*    (2016.01)
(Continued)

(52) U.S. Cl.
CPC ........... *H01M 8/12* (2013.01); *H01M 4/8889* (2013.01); *H01M 8/04089* (2013.01);
(Continued)

(58) Field of Classification Search
CPC ........ Y02E 60/525; H01M 2008/1293; H01M 8/2424; H01M 8/0247; H01M 8/1206; H01M 8/026; H01M 4/8885; H01M 8/247

See application file for complete search history.

(56) References Cited

U.S. PATENT DOCUMENTS

| 5,486,428 A | 1/1996 | Gardner et al. |
| 6,416,879 B1 | 7/2002 | Sakamoto et al. |
| (Continued) | | |

FOREIGN PATENT DOCUMENTS

| CN | 1979938 | 6/2007 |
| CN | 101346848 | 1/2009 |
| (Continued) | | |

OTHER PUBLICATIONS

PCT, International Search Report, International Application No. PCT/KR2010/002326 (mailed Jan. 28, 2011; published Mar. 31, 2011).

(Continued)

*Primary Examiner* — Emily Le
*Assistant Examiner* — Monique Wills
(74) *Attorney, Agent, or Firm* — Thompson Hine LLP

(57) ABSTRACT

The preset invention relates to a solid oxide fuel cell stack capable of producing electricity, in which unit cell modules are connected in series and in parallel, and to a manufacturing method thereof. The solid oxide fuel cell stack is manufactured by: making a unit cell module comprising at least one unit cell formed on the outer surfaces of a flat tubular support, a first electrical interconnector formed on the front end of the support and at least a portion of the outer surfaces so as to be connected to a first electrode of the unit cell, and a second electrical interconnector formed on the rear end of the support and at least a portion of the outer (Continued)

surfaces so as to be connected to a second electrode of the unit cell; and stacking the unit cell modules such that the electrical interconnectors come into contact with each other.

20 Claims, 5 Drawing Sheets

(51) Int. Cl.
- H01M 8/04089 (2016.01)
- H01M 8/2435 (2016.01)
- H01M 8/1226 (2016.01)
- H01M 8/1286 (2016.01)
- H01M 8/249 (2016.01)
- H01M 4/88 (2006.01)
- H01M 8/124 (2016.01)

(52) U.S. Cl.
CPC ....... *H01M 8/1226* (2013.01); *H01M 8/1286* (2013.01); *H01M 8/249* (2013.01); *H01M 8/2435* (2013.01); H01M 2008/1293 (2013.01); H01M 2300/0077 (2013.01); Y02P 70/56 (2015.11)

(56) References Cited

U.S. PATENT DOCUMENTS

| | | | |
|---|---|---|---|
| 6,429,051 | B1 | 8/2002 | Wood et al. |
| 6,551,735 | B2 | 4/2003 | Badding et al. |
| 7,947,386 | B2 | 5/2011 | Chung et al. |
| 8,206,867 | B2* | 6/2012 | Tokoi et al. ............. 429/443 |
| 2004/0110055 | A1 | 6/2004 | Baba et al. |
| 2006/0051641 | A1 | 3/2006 | Toriyama |
| 2007/0105012 | A1 | 5/2007 | Devoe et al. |
| 2008/0248361 | A1* | 10/2008 | Larsen et al. .............. 429/32 |
| 2010/0239940 | A1* | 9/2010 | Bourgeois et al. .......... 429/468 |
| 2011/0053046 | A1* | 3/2011 | Gil .................... H01M 8/1286 429/497 |
| 2011/0143250 | A1* | 6/2011 | Takata ............... C04B 35/2675 429/457 |

FOREIGN PATENT DOCUMENTS

| | | |
|---|---|---|
| EP | 1603183 | 7/2005 |
| JP | 2002343376 | 11/2002 |
| JP | 2003272658 | 9/2003 |
| JP | 2007012293 | 1/2007 |
| JP | 3934049 | 6/2007 |
| JP | 07-173115 | 7/2007 |
| JP | 2007173115 | 7/2007 |
| WO | 01/24300 | 4/2001 |
| WO | 02/29917 | 4/2002 |
| WO | 03/010847 | 2/2003 |
| WO | 2004/082050 | 9/2004 |
| WO | 2009/096624 | 8/2009 |
| WO | 2009/123389 | 10/2009 |

OTHER PUBLICATIONS

Extended European Search Report, European Application No. 10767233.9 (Jun. 25, 2013).
Examination Report, European Application No. 10767233.9 (Feb. 27, 2014).

* cited by examiner

STACK FOR A SOLID OXIDE FUEL CELL USING A FLAT TUBULAR STRUCTURE

PRIORITY CLAIM

This application is a National Phase of PCT/KR2010/002326 filed Apr. 15, 2010, which claims priority to Korean Patent Application No. 10-2009-0034167 filed Apr. 20, 2009.

TECHNICAL FIELD

The present invention relates, in general, to a solid oxide fuel cell stack and a manufacturing method thereof and, more particularly, to a solid oxide fuel cell stack capable of producing electricity, in which unit cell modules are connected in series and in parallel, and to a manufacturing method thereof.

BACKGROUND ART

Solid oxide fuel cells (hereinafter referred to as "SOFCs") can be considered as third-generation fuel cells and have utilized zirconium oxide, to which yttria has been added to stabilize the crystalline structure thereof, as their electrolyte. This material has oxygen ion conductivity, but is characterized in that it can provide the desired conductivity for fuel cells in the high temperature range of 800 to 1000° C. For this reason, the operating temperature of SOFC is usually 800° C. or higher, and the electrodes are made of conductive materials that can withstand this high temperature. For example, the air electrode to which air is supplied is generally made of $LaSrMnO_3$, and the fuel electrode to which hydrogen is supplied is generally made of a $Ni-ZrO_2$ mixture.

In planar-type SOFCs according to the prior art, a fuel electrode or an electrolyte support is thinly coated with another electrode or an electrolyte to make an electrolyte-electrode assembly (hereinafter referred to as "EEA") which is then inserted with an interconnector made of a conductive metal, which electrically connects the air electrodes and fuel electrodes of the underlying and overlying unit cells and in which gas channels for introducing fuel and air into the respective electrodes are formed on both sides, thereby manufacturing a cell. This planar-type solid oxide fuel cell is advantageous in that the thickness of the EEA layer is thin, but it is difficult to control the uniformity of the thickness or flatness of the EEA layer because of the characteristics of ceramics, thus making it difficult to increase the size of the cell. Also, when the EEA layer and the interconnector are stacked in alternation to stack the unit cells, a gas-sealing material is used at the edge of the cell to seal gas introduced into the cell. The glass-based material that is used as the sealing material starts to soften from about 600° C., but the solid oxide fuel cells are generally operated at a temperature higher than 800° C. in order to obtain the desired efficiency. This increases the risk of a gas leak because of the softening of the sealing material, and thus the glass material for sealing needs to be improved to be commercially viable.

An attempt to overcome the shortcomings of such planar type cells with the development of a unit cell and a stack using a flat tube-type support is disclosed in U.S. Pat. Nos. 6,416,897 and 6,429,051. In these cases, however, an interconnector creating an electrical connection with a gas channel for supplying air or fuel to the outside of the planar type cell is additionally used for stacking. Although this increases the mechanical strength of the stack and widens the contact area between the unit cells to increase power density, the interconnector is made of a metal and so mechanical and thermal stress disadvantageously occurs between the EEA layers made of a ceramic material during high-temperature operation.

To overcome this shortcoming of the metallic interconnector, monolithic unit cells have been proposed in which channels for two kinds of gases are formed in a unit cell support itself or a support stack to omit the gas channel function of the interconnector and reduce the thickness of the cell. Typical examples thereof include a monolithic stack of segmented flat tubular cells, in which the cells are segmented in the lengthwise direction of the flat tube and are electrically connected (U.S. Pat. No. 5,486,428). However, these cells have disadvantages in that a ceramic plate for air channels should additionally be used to form air channels and in that structures for electrical connection and gas supply are complicated, which makes it not easy to increase the size of the stack.

In addition, fuel cell stacks developed to date have used methods in which unit cells are electrically connected only in series (Korean Patent Application No. 10-2008-10176, Korean Patent Application No. 10-2008-30004, etc.). A problem of such methods is that a deterioration in the performance of a certain cell leads to a deterioration in the overall performance of the stack, so that all the cells need to be perfectly made and operated, which is difficult to achieve.

DISCLOSURE

Technical Problem

Accordingly, the present invention has been made keeping in mind the above problems occurring in the prior art, and an object of the present invention is to provide a novel solid oxide fuel cell stack and a manufacturing method thereof, which can solve the problems of conventional solid oxide fuel cells wherein increasing the size of unit cells is difficult due to bending of the unit cell structures during the manufacture thereof, and wherein thermal and mechanical stress occurs due to the stacking of a dual structure consisting of a unit cell and an interconnector, and also wherein unit cells are connected only in series such that all the unit cells in the stack should be perfectly manufactured and operated, which is difficult to achieve.

Another object of the present invention is to provide a novel unit cell module and a manufacturing method thereof, which can solve the above-described problems.

Still another object of the present invention is to provide a high-power monolithic solid oxide fuel cell system and a manufacturing method thereof, which eliminate the above-described problems.

Technical Solution

In order to accomplish the above objects, the present invention provides a monolithic solid oxide fuel cell stack which is manufactured by: making a unit cell module comprising at least one unit cell formed on the outer surfaces of a flat tubular support, a first electrical interconnector formed on the front end of the support and at least a portion of the outer surfaces so as to be connected to a first electrode of the unit cell, and a second electrical interconnector formed on the rear end of the support and at least a portion of the outer surfaces so as to be connected to a second electrode of the unit cell; stacking the unit cell modules such that the electrical interconnectors come into contact with each other, thereby manufacturing a unit stack module in which the unit cell modules are electrically connected in parallel; and connecting a plurality of the stack modules in series, thereby manufacturing a solid oxide fuel cell stack in which the unit cell modules are connected in series and in parallel.

In the present invention, the flat tubular support consists of a flat tubular porous structure in which a plurality of first gas flow channels (hereinafter referred to as "first gas channels") are formed in a lengthwise direction of the porous structure, and second gas flow channels (hereinafter referred to as "second gas channels") are formed on the outer surfaces of the structure.

In the present invention, the second gas channels are preferably formed by grooving the central portions of the outer surfaces, excluding both side edges of the outer surfaces, to a predetermined depth, such that they are formed between the flat tubular structures which are stacked on each other.

In an embodiment of the present invention, the electrodes of the fuel cells are formed on the surfaces of the second gas channels, preferably the upper and lower surfaces of the support, and are connected to electrical interconnectors which are formed on the front and rear ends of the support and both side edges of the outer surface.

In the present invention, at least one electrolyte-electrode assembly (EEA) consisting of an electrode layer for a first gas (hereinafter referred to as "first electrode layer), an electrolyte layer and an electrode layer for a second gas (hereinafter referred to as "second electrode layer") is formed on the surfaces of the second gas channels formed on the central portions of the outer surfaces of the support.

In an embodiment of the present invention, forming a single unit cell on the second gas channel may be performed by applying the first electrode layer, the electrolyte layer and the second electrode layer to the second gas channel such that the first and second electrode layers is connected to the electrical interconnectors, respectively, in which the electrical interconnectors exclude the second gas channel portion and include the front and rear ends of the support and both side edges of the outer surfaces.

In another embodiment of the present invention, when a plurality of the unit cells are formed, the opposite poles between the unit cells are alternately connected to each other by the electrical interconnectors, such that the first electrode layer and the second electrode layer are exposed at both opposite ends and connected to the electrical interconnectors, in which the electrical interconnectors exclude the second gas channel portion and include the front and rear of the cell support and both side edges of the outer surface.

In one embodiment of the present invention, forming the plurality of unit cells on the second gas channel may be performed by forming electrolyte-electrode assemblies (EEAs), each consisting of a first gas electrode layer, an electrolyte layer and a second gas electrode layer, intermittently at predetermined intervals along a lengthwise direction of the channel, connecting the first electrode layer with the second electrode layer in each EEA by an electrical interconnection layer, and connecting the first electrode layer of the EEA formed at one end of the second gas channel and the second electrode layer of the EEAs formed at the other end to the electrical interconnectors formed at the front and rear ends of the cell support and both side edges of the outer surface.

In the present invention, in the case of manufacturing a stack comprising the unit cell modules in which a single unit cell or a plurality of unit cells are formed, the cell modules are stacked on each other in the vertical and horizontal directions (X and Y directions) such that the same poles of the cell modules come into contact with each other so that all the modules are electrically connected in parallel, thereby manufacturing a unit stack module having an increased reaction area. Then, the stack modules are stacked in a lengthwise direction (Z direction) such that the opposite poles of the stack modules are electrically connected in series, thereby stacking the stack modules in a three-dimensional fashion. The resulting stack is subjected to a sintering process, thereby providing a novel monolithic stack in which the cell modules are adhered to each other. Thus, the monolithic stack is structurally strong, has high power density, and ensures high manufacturing and operating reliabilities, because the cell modules in the stack are electrically connected in parallel and in series. In addition, with respect to gas supply to the stack, the first gas is introduced into the lengthwise internal channels, and the second gas is introduced between the stacked flat-tubular cell modules at an angle of 90° with respect to the lengthwise direction of the stack, thus avoiding problems associated with the gas seal or mixing.

In one aspect, the present invention provides a three-dimensional fuel cell stack of unit cell modules, comprising: a flat-tubular support having internal channels and grooves formed at the central portions of the outer surfaces of the supports, the internal channels serving as first gas channels, and the grooves serving as second gas channels; a cell module having at least one unit cell formed on the second gas channel, the unit cell consisting of a first electrode layer, an electrolyte layer and a second electrode layer; a first electrical interconnector formed on the front end of the support and a portion of the outer surfaces so as to be connected to the first electrode layer at one end of the cell module; and a second electrical interconnector formed on the rear end of the support and a portion of the outer surfaces so as to be connected to the second electrode layer at the other end of the cell module.

In the present invention, the unit cell modules are stacked vertically and horizontally such that the same poles thereof are connected to each other through the electrical interconnectors formed at both side edges of the outer surfaces, so that the modules are electrically connected in parallel, and the different poles of the modules are connected to each other through the electrical connectors formed at the front and rear ends of the module, thereby providing a monolithic fuel cell stack in which the unit cell modules are connected in series and parallel.

In another aspect of the present invention, the unit cell module of the fuel cell stack comprises: a flat tubular support having internal channels and grooves formed at the central to portions of the outer surfaces of the supports, the internal channels serving as first gas channels, and the grooves serving as second gas channels; at least one unit cell formed on the second gas channel; a first electrical interconnector formed on the front end of the support and a portion of the outer surfaces so as to be connected to the unit cell; and a second electrical interconnector formed on the rear end of the support and a portion of the outer surfaces so as to be connected to the unit cell.

Advantageous Effects

In a monolithic solid oxide fuel cell stack according to the present invention, the central portions of the outer surfaces of a flat tubular structure are grooved to a predetermined depth, and at least one assembly of electrode/electrolyte/ electrical interconnection layers is formed on the surface of the grooves to form a cell module. The cell modules are stacked vertically and horizontally, thereby manufacturing a stack module having an increased current generation area. The stack modules are stacked in a lengthwise direction, thus manufacturing a three-dimensional stack which can have increased voltage. The stack thus manufactured is structurally strong and has high power density, because the cell modules in the stack are adhered to each other to provide a monolithic structure. Also, the manufactured stack ensures high manufacturing and operating reliability, because the cell modules in the stack are electrically connected in parallel and in series. In addition, in operation, the first gas is introduced into and discharged from the lengthwise internal channels of the flat tubular structure, and the second gas is introduced into and discharged from the external channels between the stacked flat-tubular cell modules at an angle of 90° with respect to the lengthwise direction of the stack. Accordingly, the present invention provides a method of designing, manufacturing and operating a technically more advanced, new stack in which gas sealing is easy and which avoids problems associated with the mixing of different gases.

DESCRIPTION OF THE REFERENCE NUMERALS IN THE DRAWINGS

Figure 1:
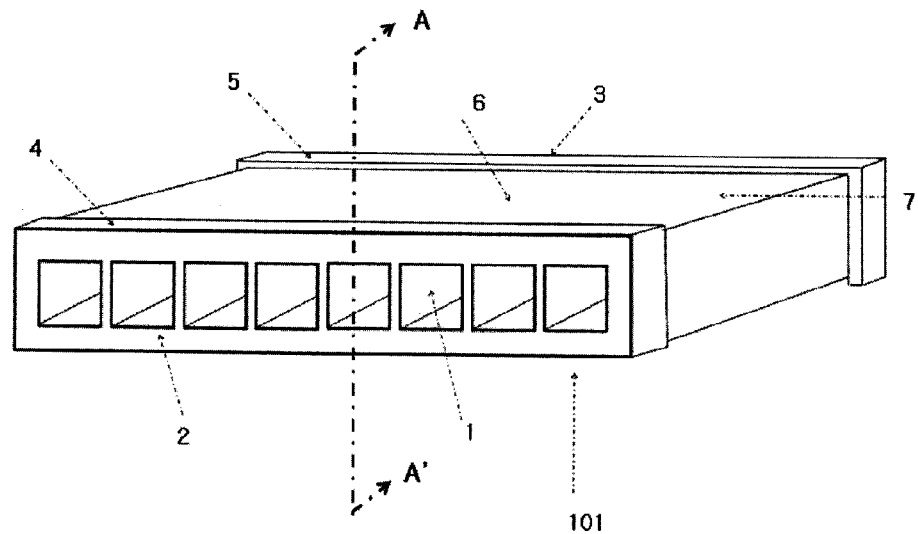
FIG. 1 is a three-dimensional view of a support for manufacturing a cell module according to the present invention, in which the support is made by grooving the central portions of the outer surfaces of a flat tubular structure having internal channels to a predetermined depth.

1: first gas flow channels in a flat tubular structure for a solid oxide fuel cell.
2: the longitudinal end of a flat tubular structure to which an electrical interconnector connected to a first gas electrode layer is applied.
3: the longitudinal end of a flat tubular structure to which an electrical interconnector connected to a second gas electrode layer is applied.
4: the outer side edge of the outer surface to which an electrical interconnector connected to a first gas electrode layer extends and is applied.
5: the outer side edge of the outer surface to which an electrical interconnector connected to a second gas electrode layer extends and is applied.
6: a portion grooved to a predetermined depth to form a second gas channel layer on the outer surface of the flat tubular structure.
7: a second gas flow channel created when the flat tubular structures are stacked vertically.
8: an external channel for cooling gas flow which is formed between the supports when the supports prepared by grooving the central portions 6 are stacked.
11: a first gas electrode layer which is intermittently applied to the external channel of a support for a solid oxide fuel cell.
12: an electrolyte layer which is intermittently applied to the external channel of a support for a solid oxide fuel cell.
13: a second gas electrode layer which is intermittently applied to the external channel of a support for a solid oxide fuel cell.
15: the boundary between the first gas electrode layer and the electrolyte layer in the external channel of a support for a solid oxide fuel cell.
16: the boundary between the second gas electrode layer and the electrolyte layer in the external channel of a support for a solid oxide fuel cell.
19: an electrical interconnection layer which is inserted into an electrolyte layer in the external channel of a support for a solid oxide fuel cell.
31: an electrical insulating layer applied to the inside of a housing.
32: an external rectangular housing for fixing unit cell modules stacked vertically and horizontally in a stack.
33: electricity collecting pads for collecting electricity from the stack end.
36: a pipeline for supplying and discharging a first gas.
37: electricity collecting plates.
38: a chamber for supplying and discharging a first gas.
39: an insulating gasket.

41: internal channels of gas inlet portions between stacked flat tubular structures in a stack
42: internal channels of gas outlet portions between within stacked flat tubular structures in a stack
43: external channel for supplying and discharging a second gas, formed between stacked supports in a stack
51: a chamber for the supply, discharge and reaction of a second gas, disposed in the middle portion of a stack
52: a chamber for introduction of a first gas, disposed at the end of a stack
53: a chamber for discharge of a first gas, disposed at the end of a stack
54: an electricity collector disposed at a negative electrode side at the stack end.
55: an electricity collector disposed at a positive electrode side at the stack end.
71: a first gas electrode layer applied to the end of a flat tubular support.
72: a second gas electrode layer applied to the end of a flat tubular support.
73: an electric interconnection layer connected with a first gas electrode layer at the end of a flat tubular support.
74: an electric interconnection layer connected with a second gas electrode layer at the end of a flat tubular support.
81: an outer housing of a system in which a plurality of stacks are disposed.
82: an insertion layer for preventing a second gas from flowing between stacks arranged vertically.
83: a chamber for supply of second gas.
84: a grid plate for distribution of a second gas and fixing of stacks.
85: a chamber for discharge of a second gas.
86: a pipeline for supply and discharge of a second gas.
87: passage for reaction of a second gas.
88: a pipeline for supply and discharge of a first gas.
91: the negative electrode end of a stack.
92: the positive electrode end of a stack.
95: an electrical interconnector between stacks.
96: the negative electrode end of stacks connected in series.
97: the positive electrode end of stacks connected in series.
100: a flat tubular structure.
101: a support having an external channel formed by grooving the central portion of a flat tubular structure.
102: a solid oxide fuel cell module manufactured from a flat tubular support.
103: a unit cell for electrical connection manufactured using a flat tubular structure.
105: a stack module in which cell modules are stacked vertically and horizontally.
106: a stack in which stack modules are staked in a lengthwise direction.

BEST MODE

Hereinafter, preferred embodiments of the present invention will be described in further detail with reference to the accompanying drawings. However, these embodiments are for illustrative purposes only and are not intended to limit the scope of the present invention in any way.

A flat tubular structure that is used to manufacture a solid oxide fuel cell stack in the present invention may be made of a conventional gas-permeable material that is stable at high temperatures. As shown in FIG. 1, it has a flattened rectangular parallelepiped shape and includes a plurality of first gas flow channels 1 extending in a lengthwise direction thereof. Central portions 6 of the upper and lower surfaces of the structure, excluding both side edges 4 and 5 of the structure, are grooved to a predetermined depth such that second gas flow channels are formed between a plurality of the structures 2 which are stacked on each other, thereby manufacturing a support 101.

The grooved central portions 6 form second gas flow channels 7 between the supports 101 when the supports 101 are stacked on each other. Also, the grooved central portions 6 prevent electrical short circuits caused by unnecessary electrical contact between unit cells, each consisting of electrodes and an electrode, formed on the surfaces of the central portions.

Figure 2:
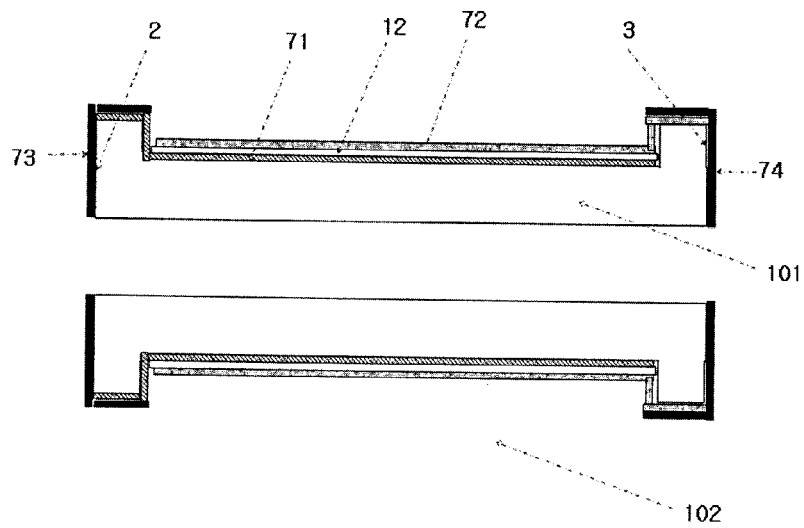
FIG. 2 is a longitudinal cross-sectional view showing a unit cell formed in the grooved central portion of a support for manufacturing a cell module according to the present invention.

The fabrication of a unit cell module for solid oxide fuel cells using the support 101 is performed by applying electrode, electrolyte and interconnection layers to the surface in a lengthwise direction and then subjecting the resulting substructure to a sintering process. As shown in FIG. 2, a single unit cell may be fabricated. Alternatively, as shown in FIG. 3, a plurality of unit cells may be fabricated.

As shown in FIG. 2, a first electrode layer 71, an electrolyte layer 12 and a second electrode layer 72 are sequentially applied to the central portion to form a single unit cell, in which the first electrode layer 71 is applied so as to cover one end of the support in addition to the central portion, and the second electrode layer 72 is applied so as to cover the other end in addition to the central portion. Also, electrical interconnection layers 73 and 74 are applied to the portion of the first electrode layer 71 applied to the one end and the portion of the second electrode layer 72 applied to the other end, respectively.

Figure 3:
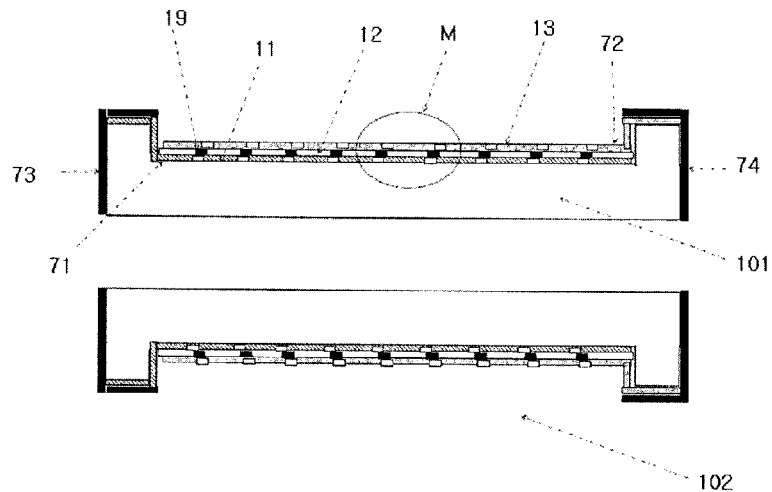
FIG. 3 is a longitudinal cross-sectional view showing a plurality of unit cells formed in the grooved central portion of a support for manufacturing a cell module according to the present invention.

As shown in FIGS. 1 and 3, each of a plurality of unit cells is formed by sequentially applying a first electrode layer 11, an electrolyte layer 12 and a second electrode layer 13 in a lengthwise direction of the support. The opposite poles between the unit cells are connected to each other by an interconnector, and the first electrode layer 71 and the second electrode layer 72, exposed at both ends of the connected cells, are connected to the electrical interconnection layers 73 and 74, respectively, such that the coated portions of the electrical interconnection layers include both ends 2 and 3 and outer side edges 4 and 5. Thus, when the supports 101 are stacked vertically or horizontally, the cell modules are electrically connected to each other by the outer side edges 4 and 5 or the ends 2 and 3.

Meanwhile, when a plurality of unit cells are formed at the central portion of the outer surface of the support 101 as shown in FIG. 3, the opposite poles between the unit cells must be electrically connected to each other and a compact layer should be formed using the electrolyte 12 and the electrical interconnector 19 in order to prevent different gases from being mixed in the unit cells. A coating method for achieving such requirements is shown in FIG. 4 which is an enlarged view of the repeatedly coated portions "M" shown in FIG. 3.

Figure 4:
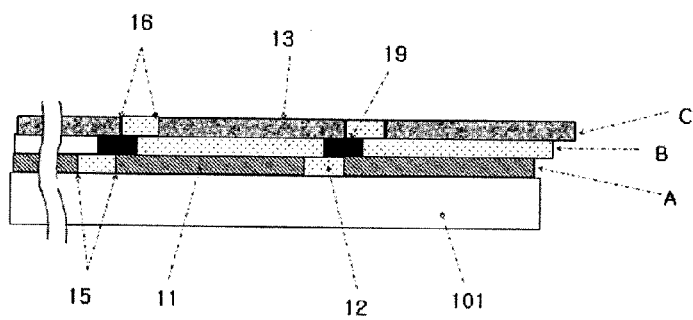
FIG. 4 is a cross-sectional view showing a method of forming electrode layers, an electrolyte layer and an electrical interconnection layer in order to stack the cells of FIG. 3 according to the present invention.

As shown in FIG. 4, in the first coating layer "A" formed on the surface of the central portion of the support, the electrolyte layer 12 is inserted into the first electrode layer 11 to prevent electric contact between the cell units. In the second coating layer "B" formed on the first coating layer, the electrical interconnection layer 19 is inserted into the electrolyte layer 12 to make the electrical connection between the opposite poles of the underlying layer "A" and the overlying layer "C". Herein, it is important that the contact portions between the different materials in the layer "B" are placed alternately with the contact portions between the different materials in the underlying layer "A" without being consistent with the layer "A", in order to prevent a first gas from leaking through the gap of the contact portions 15 between the different materials in the layer "A".

In the final coating layer "C", the electrolyte 12 is inserted into the second electrode layer 13 such that the contact portions 16 between the different materials in the layer "C" are located on half of the electrical interconnection layer 19 of the underlying layer "B" to make the electrical connection between the layers and such that a second gas can be prevented from leaking into the underlying layer "B" through the gap of the contact portions 16 between the electrolyte and the second electrode layer in the layer "C". Thus, the present invention provides a method for applying electrodes, an electrolyte and an electrical interconnector to manufacture a unit cell module 102 in which a plurality of unit cells are stacked horizontally.

Figure 5:
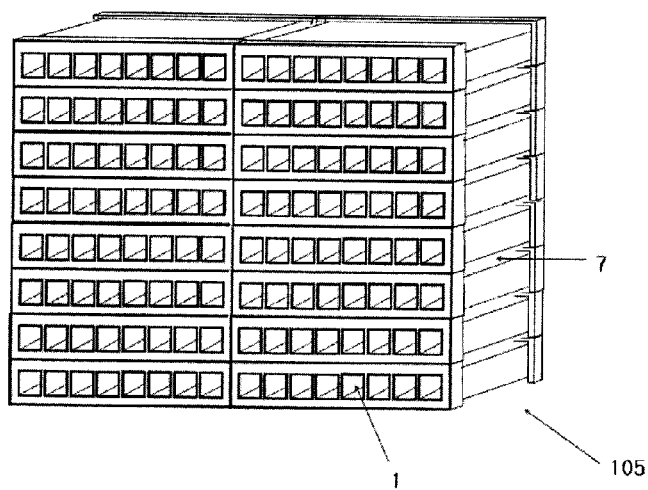
FIG. 5 is a three-dimensional view showing a unit stack module in which solid oxide fuel cell modules according to the present invention are stacked vertically and horizontally so that they are electrically connected in parallel.

In order to manufacture a final stack using cell modules comprising either a single unit cell as shown in FIG. 2 or a plurality of unit cells as shown in FIG. 3, the cell modules are stacked in the vertical and horizontal directions (X and Y directions) to manufacture a unit stack module 105 as shown in FIG. 5, such that the same poles of the electrical interconnects 4 and 5 at the side edges of the cell modules 102 come into contact with each other to make the parallel electrical connection between the cell modules 102, whereby the reaction area within the stack can be increased. Then, the stack modules 105 are stacked in a lengthwise direction (Z direction) such that the opposite poles of the electrical interconnectors 4 and 5 at the ends are connected with each other to make the series electrical connection between the stack modules, thereby increasing the voltage of the stack, thereby manufacturing a three-dimensional stack 106. The stack manufactured as described above is subjected to a sintering process while mechanical pressure is applied thereto, whereby all the cell modules are electrically connected with each other through the electrical interconnection layer and are mechanically attached to each other, thereby providing a monolithic stack.

Figure 6:
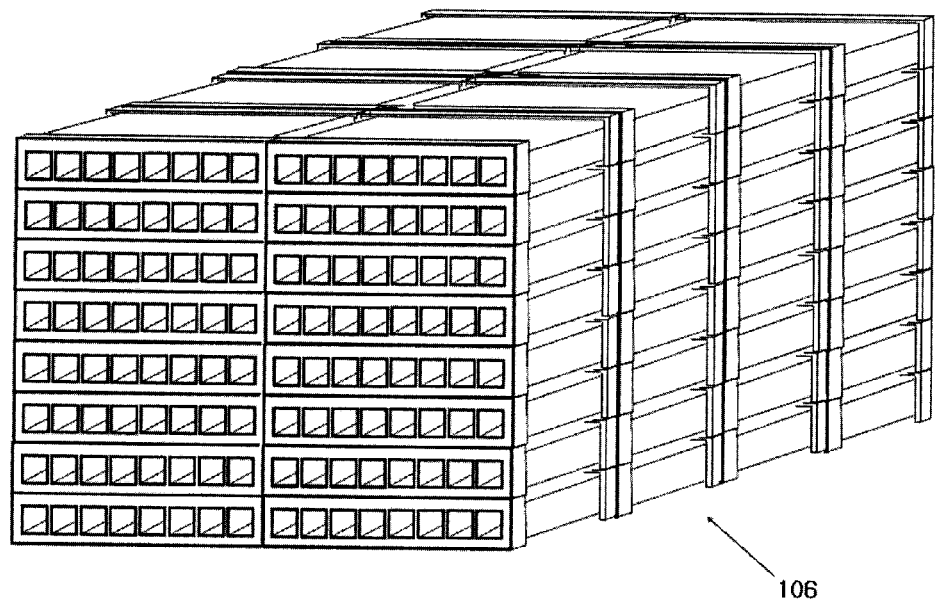
FIG. 6 is a three-dimensional view showing a monolithic stack in which unit stack modules for solid oxide fuel cells according to the present invention are stacked in a lengthwise direction.
Figure 7:
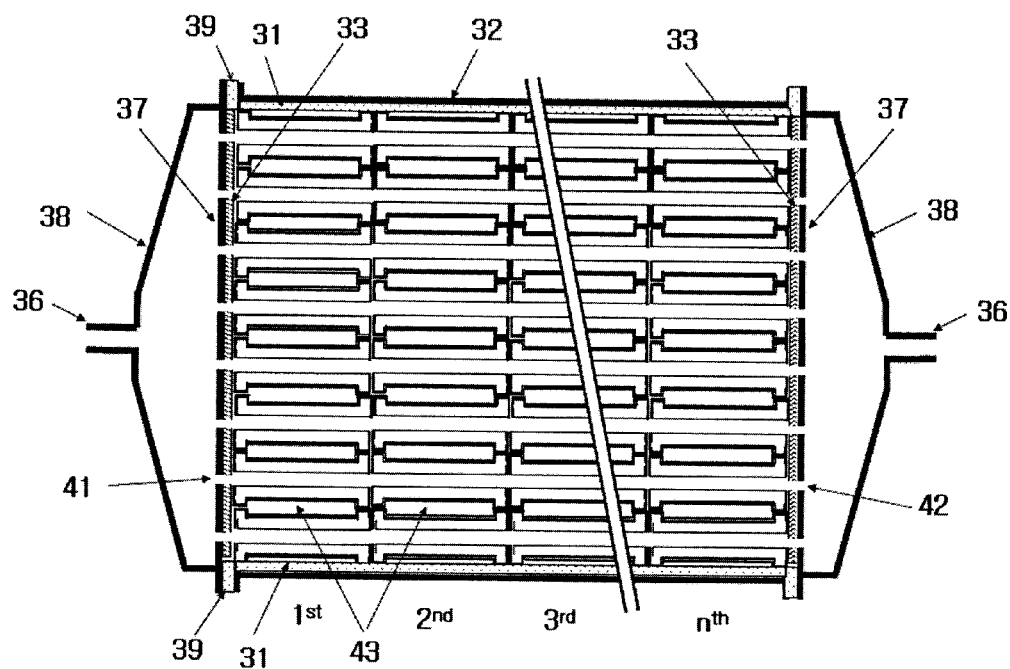
FIG. 7 is a lengthwise cross-sectional view showing a solid oxide fuel cell stack according to the present invention and sub-devices for supply and discharge of gases and electrical connection.

For reference, FIG. 6 is a three-dimensional view of the stack 106, and FIG. 7 is a partial lengthwise cross-sectional view showing a series stack of a number (n) of the unit stack modules and sub-devices for discharging gas and electricity, connected to the stack. The resulting monolithic stack 106 is mounted into a rectangular parallelepiped housing 32, which has an insulation material 31 applied to the inside thereof and is open at both ends, and electricity collecting pads 33 are attached to both ends of the stack, after which chambers 38 for supplying and discharging a first gas, which include pipelines 36 for supplying or discharging the first gas to or from the channels formed within the flat tubular supports of the stack and electricity collecting plates 37, are fastened to the housing 32. The generated electricity will be discharged from the gap between the electricity collecting plates 37 at both sides or from the chambers 38 connected with the electricity collecting plates. In order to prevent current from flowing between the chambers at both sides, an insulating gasket 39 is inserted and fastened between each of the chambers and the to housing. The first gas is supplied to the chamber 38 (shown on the left side in the figure) along the lengthwise direction of the flat tubular support such that it is dispersed and introduced into the internal channels 41 of the flat tubular cell modules connected in parallel on the unit bundles in the stack, and unreacted gas is discharged through channel outlets 42. The second gas is supplied at an angle of 90° with respect to the lengthwise direction of the stack through the chambers for supplying and discharging the second gas, attached to the left and right sides (front and back sides in the figure), along the direction perpendicular to the lengthwise direction of the flat tubular supports. Then, the supplied second gas is introduced into and discharged from the external channels 43 formed between the stacked flat-tubular cell modules.

When the size of the solid oxide fuel cell stack increases, thermal stress occurring due to an increase in the temperature of a specific portion (e.g., central portion) within the stack as a result of the accumulation of reaction heat will adversely affect the cells made of a ceramic material, thus making it difficult to increase the size of the stack.

The solid oxide fuel cell stack of the present invention is more stable than other stack models, because the mechanically stable flat-tubular structures are close to each other in a three-dimensional manner and stacked in a monolithic form. Also, when the second gas is used, it can be supplied at an angle of 90° with respect to the lengthwise direction of the stack, and thus, if necessary, the chambers for supplying the second gas can be distributed in the lengthwise direction such that the second gas can be supplied at various flow rates, thereby standardizing the lengthwise temperature gradient.

Figure 8:
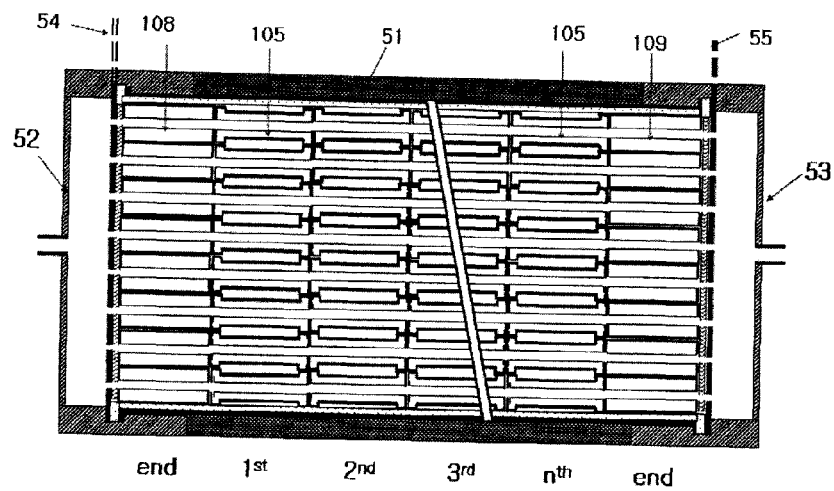
FIG. 8 is a lengthwise cross-sectional view showing reaction chambers and chambers for the supply and discharge of gases, additionally mounted to both ends of a solid oxide fuel cell stack of FIG. 7 according to the present invention.
Figure 9:
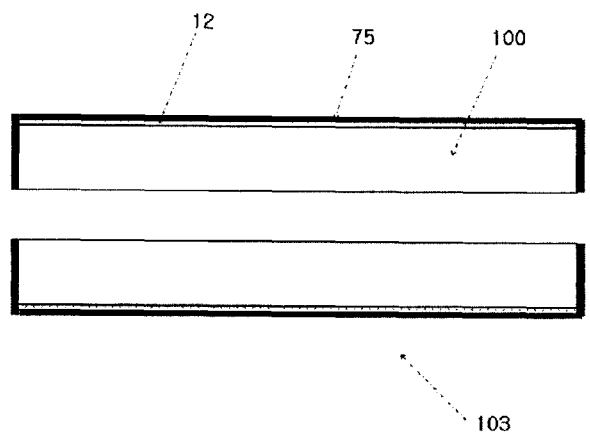
FIG. 9 is a lengthwise cross-sectional view of a flat tubular structure, which shows a method of manufacturing flat tubular structures, which are used to manufacture the stack module of FIG. 8 by vertically and horizontally stacking unit cell modules consisting of the flat tubular structures according to the present invention.

Another advantage of the flat-tubular solid oxide fuel cell stack is that it is easy to seal the supplied gas compared to the planar-type solid oxide fuel cell stack, because the gas is sealed at the ends. More preferably, the stack of the present invention may further comprise electricity collecting stack modules at the ends as shown in FIG. 8, in order to ensure that the first gas supplied is sealed in the ends of the stack and that the two gases are prevented from being mixed with each other at the boundary between the reaction chambers in the stack. The electricity collecting stack modules used in FIG. 8 can be provided by manufacturing either electricity collecting modules 103 having the electrolyte layer 12 and an electrical interconnection layer 75 applied to the outer surface of the flat-tubular structure 100 without having the second gas flow channel as shown in FIG. 9, or electricity collecting modules made of a material including the material of the first electrode layer, stacking the manufactured modules vertically and horizontally, like the cell modules for reaction. When the electricity collecting stack modules are additionally provided in the negative electrode section 108 and the positive electrode section 109 at both ends of the stack as shown in FIG. 8, the portion for supplying or discharging the first gas is connected to the outside of the high-temperature reaction chamber portion 51 so as to make sealing easy, and the chamber 52 for supplying the first gas and the chamber 53 for discharging the first gas are easily isolated from the chamber 51 for supplying and discharging the second gas (shown in the upper and lower sides in the figure) in the stack, so that mixing of the two gases can be perfectly prevented. If necessary, electricity collectors 54 and 55 may be provided at a distance from the first gas chambers 52 and 53 such that electricity can be discharged through the electricity collectors 54 and 55. This enables stacking as described below.

As described above, the stack of the present invention offers advantages in that it can become larger in size by three-dimensional stacking and in that the amount of the second gas being supplied at an angle of 90° with respect to the lengthwise direction of the stack can be suitably distributed along the lengthwise direction to control and standardize the lengthwise temperature gradient.

However, when the number of the cell modules 102 in the vertical and horizontal directions in the stack module 105 is increased, the volume of the resulting stack in the cross-sectional direction will also be increased so that there will be an increase in the cross-sectional central portion of the stack. For this reason, it is preferred to minimize the cross-sectional area of the stack, but in this case, the number of the cell modules stacked in parallel will decrease, thus reducing the reaction area of the stack.

However, the present invention can provide a new and advanced method capable of manufacturing a larger-sized solid oxide fuel cell stack system by a combination of unit stacks, which are electrically connected in parallel, in series or in a combination thereof, while avoiding the problem of temperature deviation in the stack. In this method, stacks with a minimized cross-sectional area are stacked vertically and horizontally in parallel at predetermined intervals in a reaction chamber to which the second gas is to be supplied.

Figure 10:
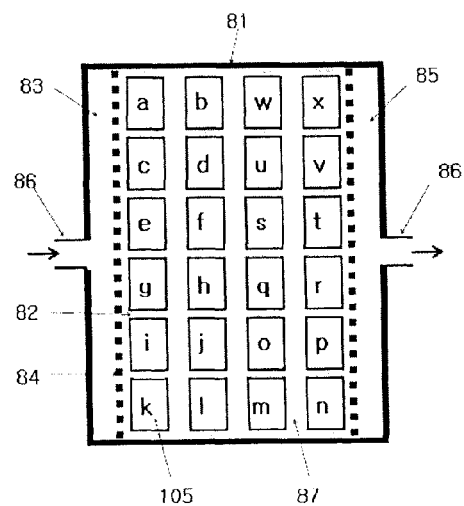
FIG. 10 is a cross-sectional view showing a method of increasing the size of a stack system according to the present invention by disposing 24 stacks in a chamber and shows the lengthwise middle portion of the chamber.
Figure 11:
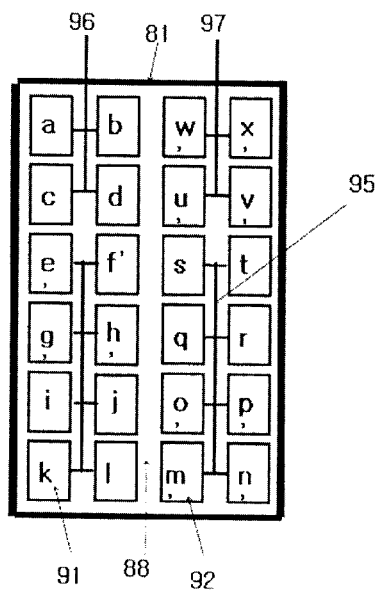
FIG. 11 is a cross-sectional view showing a method of increasing the size of a stack system according to the present invention by disposing 24 stacks in a chamber and shows the stack ends to which a first gas is supplied.
Figure 12:
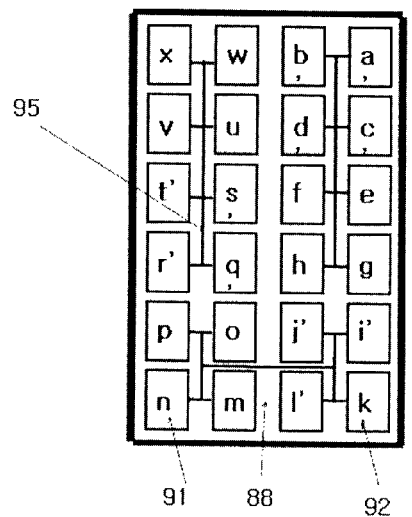
FIG. 12 is a cross-sectional view showing a method of increasing the size of a stack system according to the present invention by disposing 24 stacks in a chamber and shows the stack ends from which a first gas is discharged.

For example, FIGS. 10 to 12 show fuel cell stack systems in which unit stacks are connected in series and in parallel in a reaction chamber. FIG. 10 shows a cross-sectional view of a lengthwise middle portion of a stack system in which a total of 24 stacks are connected vertically and horizontally in a reaction chamber. As shown therein, the stacks are placed in a rectangular housing 81, and the second gas introduced into the housing passes through the external channels formed between the stacked flat-tubular cell modules in each of the stacks. For this purpose, the spaces between the vertically connected stacks should be filled with a gas sealant to prevent the second gas from passing through the spaces between the stacks 105 without causing a reaction. After the second gas has been introduced into an inlet chamber 83 having an inlet pipe 82 attached thereto, it passes through a gas distribution grid 84 and then passes through the external channels 7 formed between the cell modules 102, each consisting of the flat tubular support, in each stack. The gas that passed through the stacks finally passes through an outlet chamber 85 and is discharged through an outlet pipe 86. FIG. 11 is a cross-sectional view of the ends of stacks in a chamber into which the first gas is introduced, and FIG. 12 is a cross-sectional view of the ends of stacks in a chamber from which the first gas is discharged. The first gas introduced into the inlet chamber 88 from the left side of FIG. 11 are dispersed and introduced into the internal channels 1 of a number of the flat tubular cell modules 102 stacked vertically and horizontally, moves in the lengthwise direction and is finally discharged through the first-gas outlet chamber positioned at the ends of the stacks shown in FIG. 12. FIGS. 11 and 12 show that, for example, four stacks (a to d, e to h, h to k, l to o, p to s, or t to w) are arranged in the same polar direction and electrically connected to form a group of stacks connected in parallel. Then, as shown therein, the polar direction of the four-stack groups are alternately switched to a negative pole 91 and a positive pole 92 so that the stack groups are electrically connected in series. Specifically, the group of stacks a~d connected in series has a positive pole end in FIG. 11, and the positive electrode of the group of stacks a~d and the positive electrode of the group of stacks e~h are connected in series in the first-gas outlet chamber of FIG. 12. Then, the positive electrode of the group of stacks e~h and the negative electrode of the group of i~l are connected in the first-gas inlet chamber of FIG. 11, and the positive electrode of the group of stacks i~l and the negative electrode of the group of stacks o~n are connected in the outlet chamber of FIG. 12, and the positive electrode of the group of stacks o~n and the negative electrode of the group of stacks q~t are connected in the inlet chamber of FIG. 11, and the positive electrode of the group of stacks q~t and the negative electrode of the group of stacks u~x are connected in the outlet chamber of FIG. 12, and finally the group of stacks u~x provides the positive electrode end in the inlet chamber of FIG. 11. Thus, an electrical load can be applied between the positive electrode end of the group of stacks a~d and the positive electrode end of the group of stacks u~x in the inlet chamber of FIG. 11 to discharge electricity, and each grouping of four stacks of a total of 24 stacks can be connected in parallel to increase the area of current generation, and the groups of stacks connected in parallel can be connected in series six times to increase voltage. As described above, in the fuel cell system according to the present invention, the monolithic stack in which the unit cell modules are electrically connected in parallel and in series can be manufactured by making the unit cell modules from the flat tubular supports and stacking the unit cell modules in a three-dimensional pattern. Also, a plurality of such stacks can be disposed in parallel in reaction chambers to manufacture a stack system in which the stacks are connected in parallel, in series or in a combination thereof, thereby obtaining the desired current and voltage.

The invention claimed is:

1. A method for manufacturing a solid oxide fuel cell stack, the method comprising the steps of:
   manufacturing a unit cell module comprising at least one unit cell formed on the outer surfaces of a flat tubular porous support and having a first gas channel inside of the tubular support and a second gas channel outside of the tubular support, a first electrical interconnector coated on the front end of the support and at least a portion of the outer surfaces so as to be connected to a first electrode of the unit cell, and a second electrical interconnector coated on the rear end of the support and at least a portion of the outer surfaces so as to be connected to a second electrode of the unit cell; and
   stacking the unit cell modules such that the electrical interconnectors come into contact with each other;
   wherein first gas channels are formed in the flat tubular support, second gas channels and unit cells are formed at the central portions of the outer surfaces of the flat tubular support, and the electrical interconnectors are formed on both side edges of the outer surfaces of the flat tubular support; and
   wherein the central portions of the outer surfaces of the support are grooved to a predetermined depth, and the grooved supports are stacked to form second gas channels.

2. The method of claim 1, wherein at least one unit cell consisting of a first electrode layer, an electrolyte layer and a second electrode layer is formed in the second gas channel of each unit cell.

3. The method of claim 1, wherein the unit cell modules are stacked such that the same electrodes thereof are electrically connected in parallel through contacts of the electrical interconnectors formed on both side edges of the outer surfaces.

4. The method of claim 1, wherein the unit cell modules are stacked such that the different electrodes thereof are electrically connected in series through contacts between the electrical interconnectors formed on the front end of the modules and the rear ends of the modules.

5. A method for manufacturing a solid oxide fuel cell stack that generates electricity by an electrochemical oxidation reaction by supplying fuel gas and air thereto, the method comprising the steps of:
   grooving the central portions of the outer surfaces of a porous flat tubular structure including a plurality of internal channels for a first gas flow, excluding both side edges of the outer surfaces, to a predetermined depth, thereby manufacturing a support that provides external channels for a second gas flow when a plurality of the supports are stacked on each other;

forming a plurality of unit cells including a first gas electrode layer, an electrolyte layer, and a second gas electrode layer on the surfaces of the central portions of the support, on which the second gas channels were formed, the unit cells being spaced apart from each other at a predetermined interval in a lengthwise direction, and then connecting the different poles of the unit cells to each other by an electrical interconnector, and connecting the first gas electrode layer and the second gas electrode layer, exposed at both opposite ends, to electrical interconnectors which coat both ends of the support and the side edges of the outer surfaces of the support, thereby manufacturing a unit cell module; and stacking the unit cell modules vertically or vertically and horizontally to manufacture a unit stack module, and stacking the unit stack modules, thereby manufacturing a two-dimensional or three-dimensional stack.

6. The method of claim 5, wherein electrolyte layers are inserted between the first gas electrode layers in the first layer, electrical interconnection layers are inserted between the electrolyte layers in the second layer, and the electrolyte layers are inserted between the second gas electrode layers in the third coating layer.

7. The method of claim 5, wherein the electrical interconnection layer in the second coating layer is located at a contact portion between the electrolyte of the first coating layer and the first gas electrode layer, and a contact portion between the electrolyte layer of the third coating layer and the second gas electrode layer such that the first gas electrode layer and the second gas electrode layer are located at the opposite sides of the electrical interconnection layer.

8. The method of claim 5, wherein the first gas electrode layer and the second gas electrode layer become porous after sintering, and the electrolyte layer and the electrical interconnection layer are formed of a compact layer which is impermeable to gas.

9. The method of claim 5, wherein, when the unit cell modules are stacked in the vertical and horizontal directions other than the lengthwise direction, the same poles thereof are brought into contact with each other such that they are electrically connected to each other in parallel, thereby manufacturing the unit stack module, and when the unit stack modules are stacked in the lengthwise direction, they are stacked such that the different poles thereof are electrically connected in series.

10. The method of claim 5, wherein the stack of the unit cell modules is subjected to a sintering process in a mechanically pressed state, such that the unit module cells are physically bonded at the electrical interconnection layer applied to the ends of the unit cell modules or the outer side edges of the outer surfaces of the unit cell modules.

11. A solid oxide fuel cell stack in which unit cell modules are stacked, the unit cell module comprising:
a flat tubular porous support having internal channels and grooves formed to a predetermined depth at the central portions of the outer surfaces of the support, wherein the internal channels serve as first gas channels and the grooves serve as second gas channels;
at least one unit cell formed on the second gas channel and consisting of a first electrode layer, an electrolyte layer and a second electrode layer;
a first electrical interconnector formed on the front end of the support and on one side edge of the outer surfaces so as to be connected to the first electrode; and
a second electrical interconnector formed on the rear end of the support and on the other side edge of the outer surfaces so as to be connected to the second electrode.

12. The stack of claim 11, wherein the unit cell modules are stacked such that they connected to each other at the outer surfaces and/or the front and rear ends, thereby forming a stack in which the unit cell modules are stacked in series and in parallel.

13. The stack of claim 11, wherein the first gas flows along the internal channels in the lengthwise direction of the flat tubular support, and the second gas flows in a direction perpendicular to the first gas along the grooves connected when the unit cell modules are stacked.

14. The stack of claim 11, wherein the first gas electrode layer, the electrolyte layer and the second gas electrode layer are formed in the second gas channel, such that the first gas electrode layer and the second gas layer are connected to the electrical interconnectors formed on the front and rear ends of the support, respectively.

15. The stack of claim 11, wherein an electrolyte-electrolyte assembly (EEA) of the first gas electrode layer, the electrolyte layer and the second gas electrode layer, is formed at a predetermined interval in the lengthwise direction, and the first electrode layer and the second electrode layer in the EEAs are connected to each other by an electrical interconnection layer, and the first electrode layer formed on one end of the second gas channels and the second electrode layer formed on the other end of the second gas channel are connected to the electrical interconnectors formed on the front and rear ends of the support, respectively.

16. The stack of claim 12, wherein an electricity collecting stack module is additionally connected to the front and/or rear end of the stack.

17. The stack of claim 16, wherein the electricity collecting stack module is a stack module in which electricity collecting supports manufactured by sequentially forming an electrolyte layer and an electrical interconnection layer on the entire outer surfaces of flat tubular structures are stacked either vertically or vertically and horizontally.

18. The stack of claim 16, wherein the electricity collecting stack module is a stack module in which flat tubular structures for electricity collection, which contains the material of the first electrode and is impermeable to gas, are stacked either vertically or vertically and horizontally.

19. A solid oxide fuel cell system comprising:
a housing equipped with the solid oxide fuel cell stack according to claim 11;
electricity collecting pads attached to both ends of the stack;
a first gas chamber including a pipeline for supplying or discharging the first gas to or from the internal channels of the flat tubular support of the stack, and an electricity collecting plate; and
a second gas chamber including a pipeline for supplying or discharging the second gas to or from the external channels of the stack.

20. The system of claim 19, wherein the second gas chamber is divided into a plurality of segments in a lengthwise direction, such that cooling gas is supplied at flow rates distributed in the lengthwise direction, thereby minimizing a lengthwise temperature gradient.

* * * * *